Jan. 18, 1966  JAMES E. WEBB  3,229,568
ADMINISTRATOR OF THE NATIONAL AERONAUTICS
AND SPACE ADMINISTRATION
CONCAVE GRATING SPECTROMETER
Filed Sept. 28, 1962  2 Sheets-Sheet 1

INVENTOR.
M.V.R.K. MURTY

BY ATTORNEYS

United States Patent Office 3,229,568
Patented Jan. 18, 1966

3,229,568
CONCAVE GRATING SPECTROMETER
James E. Webb, Administrator of the National Aeronautics and Space Administration, with respect to an invention of M. V. R. K. Murty
Filed Sept. 28, 1962, Ser. No. 227,692
3 Claims. (Cl. 88—14)

The invention described herein may be manufactured and used by and for the Government of the United States of America for governmental purposes without the payment of any royalties thereon or therefor.

This invention relates generally to a concave grating spectrometer, and more particularly to a concave grating spectrometer capable of use in near and vacuum ultraviolet regions.

The extensive space exploration program of recent years, and the laboratory experimentation associated therewith, has caused a greatly increased interest in the field of ultraviolet spectroscopy and the instrumentation connected therewith. Concave grating spectrometers or monochromators have been extensively used in the near and vacuum ultraviolet regions. A great advantage of the concave grating over the plane grating is that it provides a dispersing and focusing system free of collimating and focusing lenses, thereby reducing radiation energy loss as the beams of ultraviolet radiation pass through the optical system and, also, simplifying the structure of the spectrometer.

One of the problems of the concave grating spectrometer is that of scanning the spectrum. One approach to this problem has been to rotate the concave grating about an axis passing through its center. The undesirable feature of rotating the grating is that a certain amount of defocusing of the spectrum occurs. By a proper choice of the position of the radiation entrance and exit slits, the defocusing may be minimized, although still existent. Another approach to the scanning problem is to rotate the grating about the center of the Rowland circle. Since the Rowland circle now moves on itself, there is no defocusing. However, the disadvantage of this approach is that the directions of both the entrance and exit beams must also change as the grating is rotated.

Accordingly, one object of the present invention is to provide a simple scanning arrangement for a concave grating spectrometer.

Another object of the instant invention is to provide a scanning arrangement for the concave grating spectrometer wherein movement of the concave grating is eliminated and the Rowland circle associated therewith is fixed.

A further object of the instant invention is to provide a scanning spectrometer wherein there is no defocusing of the spectrum.

The foregoing and other objects are attained in the instant invention by providing a mirror normal to the plane of the Rowland circle associated with the concave grating spectrometer, i.e., the circle drawn tangent to the face of the grating at its midpoint, having a diameter equal to the radius of curvature of the grating surface. The addition of a mirror obviously adds an additional source of reflection loss into the optical system. However, in recent times there has been progress in the direction of improving the far ultraviolet reflection of surfaces and the small reflection loss introduced is more than compensated for by the novel and desirable optical and mechanical features imparted to the spectrometer.

The ultraviolet radiation source or entrance slit is placed near the center of curvature of the concave grating on the circumference of the circle. Without the mirror the radiation spectrum, upon dispersion from the grating, is formed on the Rowland circle near the entranec slit. However, the mirror now intercepts the diffracted beams from the concave grating, and the spectrum is formed on the circle near the grating. A viewing means, or exit slit, is located at this point on the circle where the spectrum is formed.

The scanning of the spectrum formed on the Rowland circle is produced by causing the mirror to rotate about a pivot point at the center of the Rowland circle. The mirror is driven by a sine-bar mechanism so that the plane of the mirror in its rotational path always passes through the center of the Rowland circle and the spectrum wavelength scale is made linear. The rotation of the mirror in this manner moves the spectrum on the circle, and thus no defocusing occurs. An observer positioned at the exit slit may view the spetcrum of the radiation which is formed upon diffraction of the ultraviolet beam by the concave grating. Also, in view of the fact that the spectrum is formed already on the Rowland circle, more than one exit could be used so that different wavelengths could be scanned simultaneously.

In the embodiment of the invention above described, the direction of the entrance beam is fixed, and the exit beam changes its direction during the scan. However, the exit slit could be placed near the center of curvature of the grating, and the entrance slit near the grating. In this arrangement, the exit beam remains fixed in direction during the scan, but the entrance beam changes direction.

Another feature of the instant invention is that the inherent astigmatism of the concave grating spectrometer may be reduced. This is accomplished by replacing the plane mirror by a cylindrical mirror of proper radius of curvature with its axis in the plane of the Rowland circle.

Other objects and many of the attendant advantages of this invention will be readily appreciated as the same becomes better understood by reference to the following detailed description when considered in conjunction with the accompanying drawings, wherein.

Figure 1:
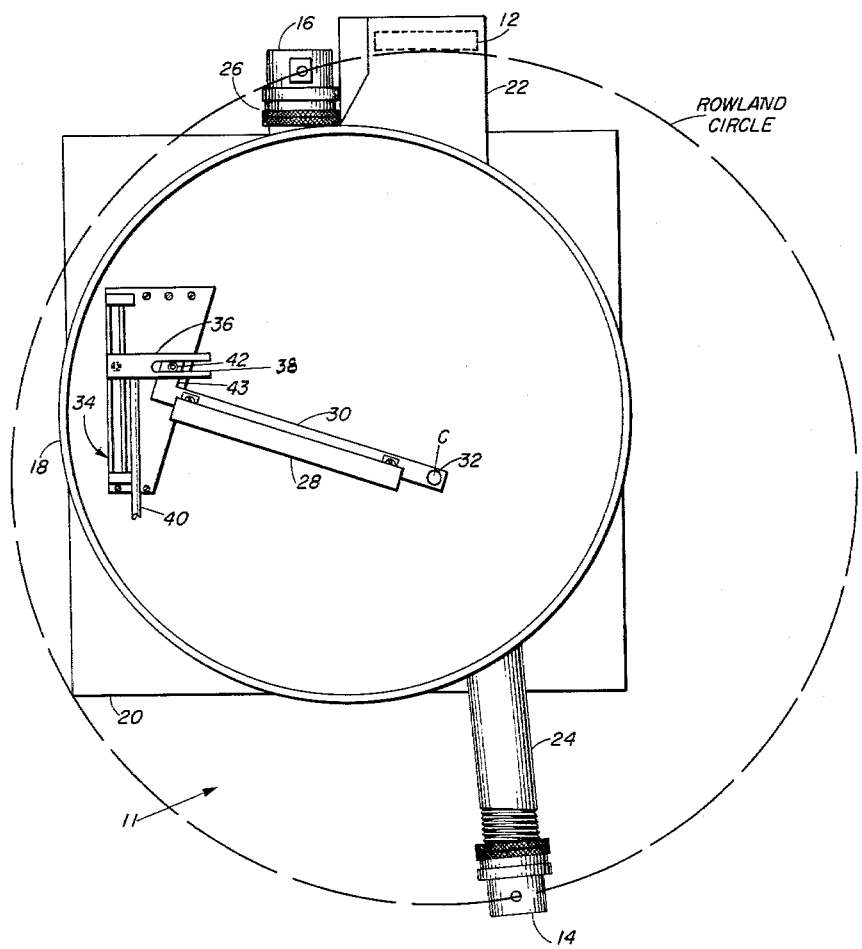
FIG. 1 is a plan view of the grating spectrometer of the instant invention.
Figure 2:
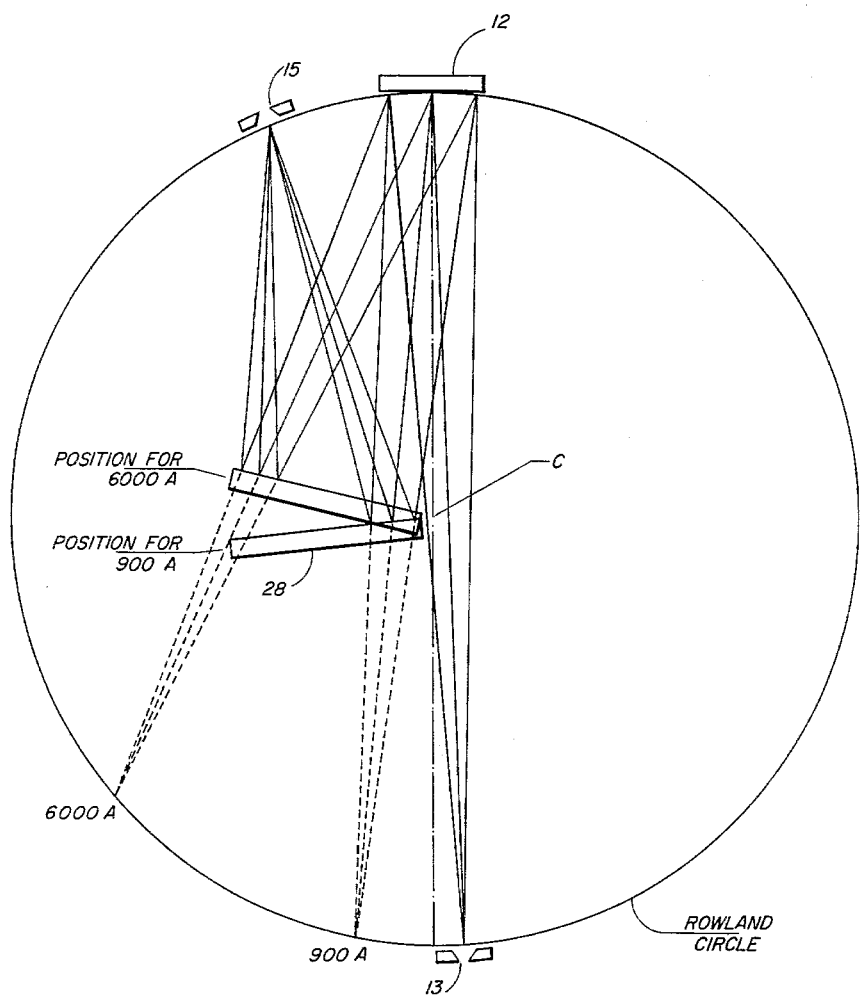
FIG. 2 is a schematic view of the spectrometer, similar to FIG. 1, illustrating the relative positions of the plane mirror for imaging the spectrum line of different wavelengths on the exit slit located on the Rowland circle.

Referring now to the drawings, wherein like reference numerals designate identical or corresponding parts throughout the several views, the spectrometer 11 is shown in FIG. 1 as comprising a concave grating 12, a mount 14 for an entrance slit 13, shown in FIG. 2, for passage of ultraviolet radiation, and a mount 16 for an exit slit 15, also shown in FIG. 2, for viewing the spectrum of the ultraviolet radiation. The elements 12, 14, 16 are placed so as to position the spherical surface of the concave grating 12, the entrance slit 13, and the exit slit 15 on the Rowland circle associated with the concave grating spectrometer. The Rowland circle is a circle drawn tangent to the face of the grating at its midpoint, having a diameter equal to the radius of curvature of the grating surface. If a radiation source or slit is placed at any point on the circumference of this circle, the spectrum produced by the grating will be imaged at other points along the circumference of this same circle.

Concave gratings rather than plane gratings are used in the vacuum ultraviolet region so as to achieve dispersion and focusing with one element, and thus reduce energy losses as the radiation passes through the optical system. A concave grating is a pattern of rulings on a polished concave spherical surface, the rulings being the intersections with the surface of equidistant planes parallel to the principal axis of the surface. The surface acts at the same time as a grating and as a concave mirror.

The entrance slit 13 is placed on the Rowland circle near the center of curvature of the concave grating. The viewing means, exit slit 15, is located on the Rowland circle adjacent to the concave grating 12.

The grating, and the exit and entrance slits, are structurally connected together through a ring member 18 secured to a base member 20. The grating 12, the entrance slit mount 14, and the exit slit mount 16 are attached to the ring member through tubular arms 22, 24 and 26 extending from corresponding openings in the ring member 20. The concave grating 12 may be connected to its tubular arm through any conventional clamping or securing means.

A plane mirror 28 secured to a pivotable member 30 is positioned to extend normal to the plane of the Rowland circle. The member 30 is attached to a pivot point 32 located at the center of the Rowland circle at its one extremity and at its other extremity is adapted to be driven through a rotational path by sine-bar mechanism 34 secured to base 20. A sine-bar mechanism carriage 36 has formed therein a groove 38 and is reciprocated by a drive shaft 40. The drive shaft 40 may be connected to any well known actuation means such as an electric motor, or may be hand operated. A roller 42 positioned on an arm 43 extends from member 30 and coacts with groove 38 to rotate the plane mirror 28 about an axis passing through the center of the Rowland circle. The Rowland circle is imaged virtually on itself in this plane mirror 28.

In the absence of plane mirror 28, the spectrum of the radiation passing through the entrance slit 13 would be defracted from grating 12 and would be formed on the Rowland circle near the entrance slit, as shown by the dashed lines in FIG. 2. However, the plane mirror 28 rotating about the center of the circle intercepts the beams dispersed from grating 12 and images the spectrum on the Rowland circle adjacent to the grating at exit slit 15. The rotation of the plane mirror 28 moves the spectrum along the Rowland circle across the viewing slit and thus no defocusing occurs. By using the sine-bar mechanism 34 to rotate the plane mirror, the wavelength scale is made linear.

In FIG. 2, the relative position of the entrance and exit slits 13, 15, the concave grating 12 and the rotatable mirror 28 are shown when the mirror is in position to image a 900 Angstrom line on the viewing means and again when the mirror is in position to image a 6000 Angstrom line on the viewing means. It will be seen that the plane mirror during its rotational path will scan the radiation spectrum, successively imaging the various spectrum wavelengths onto the viewing means 15.

To again briefly summarize the operation of spectrometer 11, ultraviolet radiation passes through entrance slit 13, is incident upon and diffracted by concave grating 12, is reflected by rotating mirror 28, and is imaged upon the viewing means 15. It may be readily seen, therefore, that the spectrometer provides an effective arrangement for spectrum scanning in a concave grating spectrometer. Also, it will be noted that in view of the fact that the spectrum is formed already on the Rowland circle, more than one exit could be used so that different wavelengths could be scanned simultaneously.

In the above described embodiment, it is essential that the plane mirror must not intercept the incident beam from the entrance slit to the concave grating. This means that the shortest wavelength beam required must be separated from the incident beam so that there is no overlapping between them beyond the center of the Rowland circle. To insure against overlapping, it may be shown that the following relationship is necessary $$\alpha \geq [(W/2R) - (\lambda_1/2\sigma)]$$

where $\alpha$=angle of incidence on the grating, $W$=width of the grating ruled area, $R$=radius of curvature of the grating, $\sigma$=grating constant, and $\lambda_1$=shortest wavelength required.

The length of the plane mirror required is approximately given by the following expression $$L \geq \frac{R \sin \beta}{2}$$

where $L$=length of the plane mirror, and $\beta$=angle of diffraction for the longest wavelength $\lambda_2$.

The height of the plane mirror is about one half of the ruling length neglecting astigmatism and slit length. The height should be estimated taking these factors into account. The size of the plane mirror required could as well be established by a suitable drawing to scale.

In the physical embodiment upon which the schematic illustration of FIG. 2 was based, the concave grating radius=1000 mm.; ruled area=100×100 mm.; the grating constant=600 L/mm.; and the mirror size approximately=9"×4".

In an alternate embodiment of the instant invention, not shown, the exit slit could be placed near the center of curvature of the grating and the entrance slit near the grating. In this arrangement, the exit beam remains fixed in direction during the scan but the entrance beam changes direction and is reflected by the plane mirror onto the grating surface.

In a further modification of the instant invention, the astigmatism inherent in the concave grating spectrometer may be controlled to a limited extent by substituting a cylindrical mirror in place of the plane mirror. The cylindrical mirror must be of proper radius of curvature with its axis located in the plane of the Rowland circle. When astigmatism is corrected in this way for a wavelength is midway between the two extreme wavelengths the astigmatism for the long wavelength end is reduced and for the short wavelength end is increased.

It will therefore be seen, upon consideration of the above disclosure, that a relatively simple and effective scanning arrangement has been provided for a concave grating spectrometer. It will be further noted that the described scanning arrangement has been provided with a minimum of additional parts, and that the scan spectrum remains in perfect focus on the Rowland circle.

Obviously, numerous modifications and variations of the present invention are possible in the light of the above teachings. It is therefore to be understood that within the scope of the appended claims, the invention may be practiced otherwise than as described herein.

What is claimed as new and desired to be secured by Letters Patents of the United States is:

1. A spectrometer capable of use in the ultraviolet region comprising:
   a fixedly mounted concave grating;
   an entrance slit positioned on the circumference of the Rowland circle associated with said grating and located adjacent the center of curvature of the grating for passage of radiation directly incident thereon;
   a viewing means for radiation dispersed from said grating positioned on the circumference of said circle and located adjacent the grating;
   a mirror located within the circumference of said circle and positioned normal to the plane thereof for intercepting only the dispersed radiation from the grating and reflecting this radiation onto said viewing means, the plane of the mirror reflecting surface passing through the center of the circle; and
   means for rotating said mirror about an axis passing through the center of said circle, thereby moving the spectrum of said dispersed radiation across said viewing means.

2. A spectrometer as defined in claim 1, wherein said rotating means comprises a sine-bar mechanism.

3. A spectrometer as defined in claim 1, wherein said viewing means comprises an exit slit.

(References on following page)

References Cited by the Examiner

UNITED STATES PATENTS

| | | | |
|---|---|---|---|
| 2,540,821 | 2/1951 | Harker | 250—51.5 |
| 2,548,548 | 4/1951 | Menzies et al. | 88—14 |
| 2,723,589 | 3/1955 | Bullock | 250—43.5 X |
| 2,764,909 | 10/1956 | Caldecourt | 88—14 |
| 2,805,342 | 9/1957 | Lang | 250—51.5 |
| 2,805,343 | 9/1957 | Lang | 250—51.5 |
| 3,090,863 | 5/1963 | McPherson | 250—43.5 |

JEWELL H. PEDERSEN, *Primary Examiner.*

RALPH G. NILSON, FREDERICK M. STRADER, *Examiners.*

H. S. MILLER, G. E. MATTHEWS, R. L. WIBERT, *Assistant Examiners.*